Patented Oct. 16, 1951

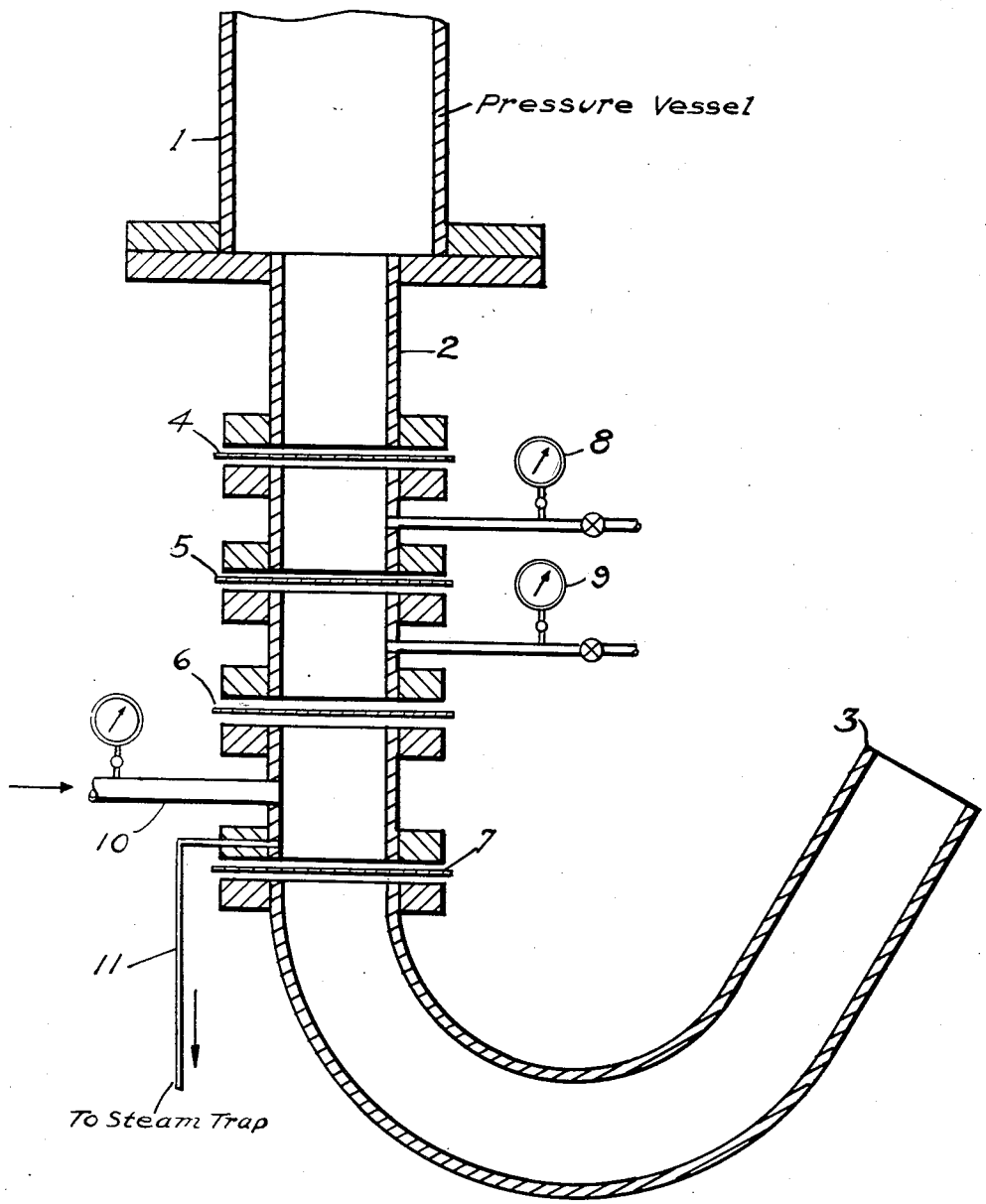

2,571,961

UNITED STATES PATENT OFFICE 2,571,961

SAFETY DEVICE FOR PRESSURE VESSELS

Lloyd B. Smith, Baton Rouge, La., assignor to Standard Oil Development Company, a corporation of Delaware Application March 19, 1948, Serial No. 15,901

4 Claims. (Cl. 220—88)

1

This invention relates to an improved safety device for use on pressure vessels containing inflammable material. In particular, the invention concerns apparatus to be used in conjunction with such pressure vessels permitting release of the pressure when it has reached a critical or dangerous level and simultaneously causing a dilution or smothering of the inflammable material with an inert fluid.

Particularly hazardous problems are connected with the operation of chemical processes involving volatile and inflammable materials. Frequently it is necessary to conduct such processes at high temperatures and high pressures, at which conditions the possibility of explosions becomes exceedingly grave. This situation is particularly prevalent in the oil refining industry wherein numerous processes entail handling volatile, inflammable hydrocarbons under dangerous conditions. Similarly, the invention is of application whenever or wherever storage tanks are utilized containing materials which will produce or give off inflammable explosive gases or vapors. In all these cases it is essential that special safety precautions be taken to cope with abnormal conditions which may arise creating a fire or explosion hazard.

It is therefore the principal object of this invention to equip a tank or vessel of the type described with a device which will not only release pressure when a critical limit is reached but also will materially lessen the fire hazard by automatically diluting the inflammable gas with an inert gas or an actual fire extinguishing fluid.

In accordance with the present invention therefor, a pipe of substantial volume is connected to the pressure vessel to be protected. Frangible disks are positioned in this pipe so as to seal the pipe up to a particular pressure at which pressure the disks are adapted to fracture, freeing the pipe. For example, the disks may be so chosen as to permit release of the pressure on the vessel by fracture of the disks at 500 lbs./sq. in., at 2,000 lbs./sq. in., or at any desired pressure. It is appreciated that use of such disks on pressure vessels in various ways has long been known to the art. The point of novelty of the present invention therefore is to employ a plurality of disks whereby an open inert gas or liquid line may be contained between two of the disks. Consequently, when the disks are fractured by an excessive increase of pressure in the vessel, the stream of inert fluid will simultaneously be released, serving to dilute the inflammable material and serving to reduce the fire hazard. This

2 invention is of particular application to vessels wherein a rupture of safety disks is operative to cause a flashing of fluids in the vessel whereby a sharp decrease in pressure within the vessel may follow, causing air to be sucked into the vessel with the consequent danger of exploding the entire vessel. In such cases it will be noted that the apparatus of this invention prevents any influx of air and consequently reduces or eliminates the possibility of such an explosion.

This invention may be fully understood by reference to the accompanying drawing which simply and diagrammatically illustrates an embodiment of this invention.

Referring to the drawing, the numeral 1 designates a pressure vessel. As illustrated, a downwardly extending pipe 2 of substantial size as compared to the diameter of the vessel is connected to the bottom of this vessel vented to the atmosphere through the upturned opening 3. It is apparent that pipe 2 may be positioned as shown at the bottom of the pressure vessel 1 or if desired may be positioned at the top of the vessel or at any other desired point of the vessel. It is important the pipe 2 be of substantial size so as to readily permit a large flow of material from the tank 1 so as to sharply reduce the pressure in tank 1 as required under hazardous or abnormal conditions. Positioned in the pipe 2 are a series of frangible disks 4, 5, 6 and 7. These disks may be conveniently held in the pipe by means of standard pipe flange couplings as shown. Alternately any desired means of supporting the disks in the pipe so as to form gastight chambers may be employed. The material of the disks is not a particular feature of this invention and it is to be understood that any type of frangible disks may be employed, a wide variety of disks being available for this purpose. Thus the disks may comprise 28 gauge steel rupture disks, or the disks may comprise glass or plastic disks, or may consist of any other desired material. The size and nature of the disks will clearly depend upon the pressure it is desired the disks to fracture at. In the embodiment illustrated, it is generally preferred that frangible disk 4 be somewhat stronger than disks 5, 6 and 7 so that on fracture of the frangible disk 4 fracture of the remaining disks is sure to follow. Connecting to the closed section of pipe 2 formed by the disks 4 and 5 is a pressure gauge 8. The function of this gauge is to detect any change in the pressure existing between disks 4 and 5 which would be indicative of leakage of the high pressure material in the vessel 1 past the disk 4. Thus if the flanges holding disk 4 or the disk itself begin to corrode or wear away, this situation will be detected by observing the pressure change on gauge 8. Similarly a pressure gauge is maintained between disks 5 and 6 which will indicate leakage of disks 5 or 6. A large line 10 is positioned in the walls of pipe 2 in the section of the pipe between disks 6 and 7. Line 10 is open to a supply of inert fluid which is preferably maintained at a low pressure. It is important that a substantial volume of the inert fluid be available for application to pipe 10. This fluid is at all times connected to pipe 10, without restriction by valves in the line, so that on fracture of disks 6 and 7 it will be released to flow into pipe 2. It is preferred that the fluid supplied to line 10 be of low pressure so as to prevent any serious application of pressure to the contents of tank 1 on fracture of the frangible disks; in other words to prevent back pressure on the tank 1 when the disks are fractured. It is particularly contemplated that the fluid connected to line 10 comprise low pressure steam although it is to be understood that nitrogen, carbon dioxide, carbon tetrachloride, water, or other inert fluids may be employed. In the event steam is the fluid applied to line 10, it is desirable to provide an auxiliary line 11 from the lower part of the chamber formed by disks 6 and 7, to permit release of water condensate to a steam trap as shown on the drawing. A check valve may be installed in line 10 to prevent high pressure vapor or liquid from momentarily backing up the low pressure fluid, (steam or inert) into the main steam lines or other fluid reservoirs at the instant of rupture, when higher pressures are existing in line 2.

It will be observed that when the pressure of the material in tank 1 exceeds a critical limit as determined by the thickness and nature of the frangible disks, disks 4, 5, 6 and 7 will be fractured. Fracture of these disks will permit flow of the material from tank 1 through line 2 to the atmosphere. Shortly thereafter fracture of these disks will permit flow into pipe 2 of the inert fluid from line 10. This fluid will be effective in substantially diluting the inflammable contents released from vessel 2 and at the same time will be effective in preventing any influx of air through opening 3 in the event of a sudden drop in pressure of the material in vessel 2. In the event fire breaks out, the inert fluid will aid in smothering or extinguishing the flames. It is to be understood that while the embodiment of this invention illustrated employs 4 frangible disks, this number is not required as two disks will perform the necessary functions. Thus if desired disks 4 and 5 may be eliminated, relying upon disks 6 and 7 to perform the functions described. At the same time, if desired, a greater number of disks may be employed and similarly these disks may be arranged in any desired fashion. Insofar as this invention is capable of many modifications it is to be understood the scope of this invention is to be limited only by the appended claims wherein the novelty of the invention is set forth.

Having now described the invention, what is claimed is:

1. A safety device for use on pressure vessels comprising a pipe of substantial capacity connected to the pressure vessel, at least two imperforate frangible discs positioned within and closing off said pipe at displaced points within the pipe, whereby a closed chamber is provided bounded by the two frangible discs and the portion of the pipe between the two discs, each of said frangible discs having about the same high pressure rupture limit, and a conduit entering into said closed chamber providing a large volume of low pressure non-combustible fluid to said chamber.

2. The apparatus defined by claim 1 wherein the frangible disk positioned first in the pipe with respect to the pressure vessel is adapted to preferentially fracture at a somewhat higher pressure than the others.

3. The apparatus defined by claim 1 wherein a pressure gauge is connected to the said pipe of substantial diameter between the said frangible disks.

4. The apparatus defined by claim 1 wherein the said inert fluid comprises low pressure steam.

LLOYD B. SMITH.

REFERENCES CITED

The following references are of record in the file of this patent:

UNITED STATES PATENTS

| Number | Name | Date |
| --- | --- | --- |
| 1,584,523 | Egbert | May 11, 1926 |
| 1,703,624 | Huff et al. | Feb. 26, 1929 |
| 2,346,727 | Camp et al. | Apr. 18, 1944 |
| 2,387,353 | Raymond | Oct. 23, 1945 |